(12) United States Patent
Roth (10) Patent No.: US 9,777,870 B2
(45) Date of Patent: Oct. 3, 2017

(54) BRACKET FOR SEISMIC BRACING OF CONDUITS

(71) Applicant: Steven Andrew Roth, Alamo, CA (US)

(72) Inventor: Steven Andrew Roth, Alamo, CA (US)

( * ) Notice: Subject to any disclaimer, the term of this patent is extended or adjusted under 35 U.S.C. 154(b) by 0 days.

(21) Appl. No.: 15/084,484

(22) Filed: Mar. 30, 2016

(65) Prior Publication Data

US 2016/0289957 A1 Oct. 6, 2016

Related U.S. Application Data

(60) Provisional application No. 62/178,081, filed on Mar. 30, 2015.

(51) Int. Cl.
| | |
|---|---|
| F16M 13/00 | (2006.01) |
| F16L 3/00 | (2006.01) |
| F16L 3/10 | (2006.01) |
| F16L 3/11 | (2006.01) |
| F16L 3/16 | (2006.01) |
| F16B 9/02 | (2006.01) |

(52) U.S. Cl.
CPC ............... *F16L 3/00* (2013.01); *F16L 3/1091* (2013.01); *F16L 3/11* (2013.01); *F16L 3/16* (2013.01); *F16B 9/026* (2013.01)

(58) Field of Classification Search
CPC ..... F16L 3/133; F16L 3/24; F16L 3/14; F16L 3/233; F16L 3/237; F16L 3/22; F16L 3/08; F16L 3/11; F16L 3/223; F16L 3/01; F16L 3/02; F16L 3/10; F16L 3/1091; F16L 3/13; F16L 3/227; F16L 3/00
USPC .................. 248/49, 58, 61, 62, 63, 65, 74.1
See application file for complete search history.

(56) References Cited

U.S. PATENT DOCUMENTS

| | | | | |
|---|---|---|---|---|
| 5,832,679 | A * | 11/1998 | Roth | E04H 9/02 52/167.3 |
| 6,273,372 | B1 * | 8/2001 | Heath | B25B 5/006 248/317 |
| 9,163,422 | B2 * | 10/2015 | Heath | E04H 9/02 |
| 2004/0031887 | A1 * | 2/2004 | Heath | F16L 3/16 248/62 |
| 2005/0189452 | A1 | 9/2005 | Heath | |
| 2006/0024127 | A1 * | 2/2006 | Heath | F16L 3/133 403/150 |

OTHER PUBLICATIONS

Eaton's B-Line Business, "Seismic restraints system guidelines", Seismic Brace Components—Tolco Rod Stiffener, Aug. 15, 2013, p. 5-7.
International Seismic Application Technology (I.S.A.T.), "Application & Design Manual", Stiffening Requirements—Threaded Rod, Second Edition, Apr. 18, 2001, p. G2.

(Continued)

*Primary Examiner* — Steven Marsh
(74) *Attorney, Agent, or Firm* — Steven R. Vosen (57) ABSTRACT

A bracket useful for seismic bracing of conduits is described. The bracket is placeable over a threaded rod and includes sidewalls for accepting a fastener and a pair of apertures for attaching to a brace. Certain brackets are stackable, allowing for the attachment of multiple braces from a single anchored rod. Other brackets include two parts that allow the bracket to be assembled about a threaded rod without removing elements which might previously be attached to the rod.

31 Claims, 11 Drawing Sheets

(56) References Cited

OTHER PUBLICATIONS

Mason West, Inc., "Seismic Restraint Guidelines for Suspended Distribution Systems", Second Edition, Feb. 20, 2015, pp. 68, 78 and 79.
http://phd-mfg.com/products/pipe-hangers-devicesiband-hangers-or-copper-tubing-band-hanger/, Data Sheet.
www.erico.com, Loop Hangers, Swivel Loop Hanger 115, p. 21.
http://www.anvilintl.com/SharedContent/Pdf/Literature_Catalog/Pipe_Hangers.pdf, pp. 20, 21, 24, 36 & 38.
Steven A. Roth, co-pending U.S. Appl. No. 14/789,879, filed Jul. 1, 2015.
Steven A. Roth, co-pending U.S. Appl. No. 15/052,067, filed Feb. 24, 2016.
Steven A. Roth, co-pending U.S. Appl. No. 15/018,054, filed Feb. 8, 2016.

* cited by examiner

BRACKET FOR SEISMIC BRACING OF CONDUITS

CROSS-REFERENCE TO RELATED APPLICATIONS

This application claims the benefit of U.S. Provisional Application No. 62/178,081, filed Mar. 30, 2015, the contents of which are hereby incorporated by reference in its entirety.

BACKGROUND OF THE INVENTION

Field of the Invention

The present invention relates to an apparatus employed in the building construction industry and more particularly to devices used to brace and/or stabilize suspended loads.

Background

The interior of commercial buildings may include numerous service elements, including conduits, pipes, ducting, systems and the like, referred to herein without limitation as "conduits." Typically, conduits are suspended from an overhead structure using a plurality of tension assemblies that are spaced along the length of the conduit, where the tension assemblies include a hanger, clamp or trapeze, referred to herein without limitation as a "hanger," to cradle or support the conduit.

While the use conventional hangers is sufficient to support conduits under normal, static loading conditions, a "seismic event," which may be, for example, an earthquake, explosion, collision or like event, moves the conduit relative to the building and result in lateral and/or axial movement of the conduit relative to the building. This movement may, in turn, dramatically increase the load on the hanger and/or on the overhead structure to which the hangers are attached. Seismic events of sufficient intensity may damage the hanger, conduit and/or the overhead structure supporting the hanger.

Thus there is a need in the art for a bracket for bracing conduits suspended from overhead structures. The bracket should inhibit or prevent motion of the conduit and/or hanger relative to the overhead structure supporting the hanger. The bracket should also be compatible for use with prior art hangers, be easier to install and be lighter, smaller, and less expensive than prior art brackets, and should be easy to manufacture.

BRIEF SUMMARY OF THE INVENTION

The present invention provides a bracket that is attachable to a hanger and/or a building surface, preferably the overhead structure that supports the hanger and can be used to brace a load to the building structure.

The use of inventive bracket in bracing a load may prevent damage to buildings caused by movement of conduits which are suspended from the building. In certain embodiments, the brackets may be used to provide stability to conduit hanger assemblies by reducing lateral and/or axial movement during a seismic event.

Further, the use of the inventive bracket allows for bracing loads using other components that are standard in the industry and will work over a broad range of load values. This is achieved by using different sized brackets. The different sized brackets all have the same basic appearance and vary slightly in dimension and gage to conform closely to the size of the anchor being used. The size of each anchor determines the load range at that location so this inventive seismic bracket addresses that range rather than a large universal bracket that is one-size-fits-all.

Certain embodiments provide an apparatus for mounting to a threaded rod protruding from a mounting surface. The apparatus includes a bracket including: a first portion including a first surface having a first aperture; a second portion extending away from the first portion and including a second aperture and a first fastener surface; and a third portion extending away from the first portion and including a third aperture and a second fastener surface. The first aperture is sized to accept the threaded rod when the first surface is placed against the mounting surface. The first fastener surface and the second fastener surface are both parallel to the first portion and are spaced by a gap distance on either side of the first aperture. The second aperture and the third aperture are aligned to accept a fastener that is generally perpendicular to the threaded rod when the first surface is placed against the mounting surface.

Certain embodiments provide a bracket that includes a first bracket part and a second bracket part. The first bracket part includes a pair of first walls connected by a first bottom having a first edge and separated by a distance greater than the diameter of the threaded rod. The second bracket part includes a pair of second walls connected by a second bottom having a second edge separated by a distance greater than the diameter of the threaded rod. When first bracket part is placeable with the first edge against the threaded rod and such that the second bracket part is placeable with the second edge against the threaded rod to form the first aperture between the first edge and the second edge.

Certain embodiments provide an apparatus for mounting to a threaded rod protruding from a mounting surface. The apparatus include a first bracket configured for mounting on the surface including: a first portion including a first surface having a first aperture; a second portion extending away from the first portion and including a second aperture and a first fastener surface; and a third portion extending away from the first portion and including a third aperture and a second fastener surface. The second aperture and the third aperture are aligned to accept a fastener that is generally perpendicular to the threaded rod when the first surface is placed against the mounting surface. The first fastener surface and the second fastener surface are both parallel to the first portion, are spaced by a gap distance on either side of the first aperture, and define a plane perpendicular to and between the first fastener surface and the second fastener surface. The first aperture is sized to accept the threaded rod when the first surface is placed against the mounting surface. The second bracket is configured for mounting on the first bracket, and includes a first portion including a first surface having a first aperture; a second portion extending away from the first portion and including a second aperture and a first fastener surface; and a third portion extending away from the first portion and including a third aperture and a second fastener surface. The second aperture and the third aperture are aligned to accept a fastener that is generally perpendicular to the threaded rod when the first surface is placed against the mounting surface. The first fastener surface and the second fastener surface are both parallel to the first portion, are spaced by a gap distance on either side of the first aperture, and define a plane perpendicular to and between the first fastener surface and the second fastener surface. The first aperture is sized to accept the threaded rod when the first surface is placed against the first and second fastener surfaces of the first bracket.

The inventive brackets provide a device that is small, simple, light weight, inexpensive and easily installed. The close spacing of the sides to the anchoring fastener enables the bracket sides to be the primary load bearing portion of the bracket. The sides, being close to each other, yield a smaller conformation which provides more strength from a lighter material than is typically used in seismic brackets. Although a washer can be used in combination with the preferred embodiment, the bracket can be configured so that a washer is not required. This is a distinct advantage when overhead installation is performed. In addition, there is an alternate embodiment of the inventive seismic bracket that is easily retrofitted to existing buildings because of its ability to cooperate with standard building hardware. This embodiment of the inventive seismic bracket is composed of two cooperating elements that allow retrofit installation without the need to disassemble the existing installed assembly. Further, the invention's composition and design allows for stacking of multiple seismic brackets to be installed at a single anchorage.

These features together with the various ancillary provisions and features which will become apparent to those skilled in the art from the following detailed description, are attained by the bracket the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
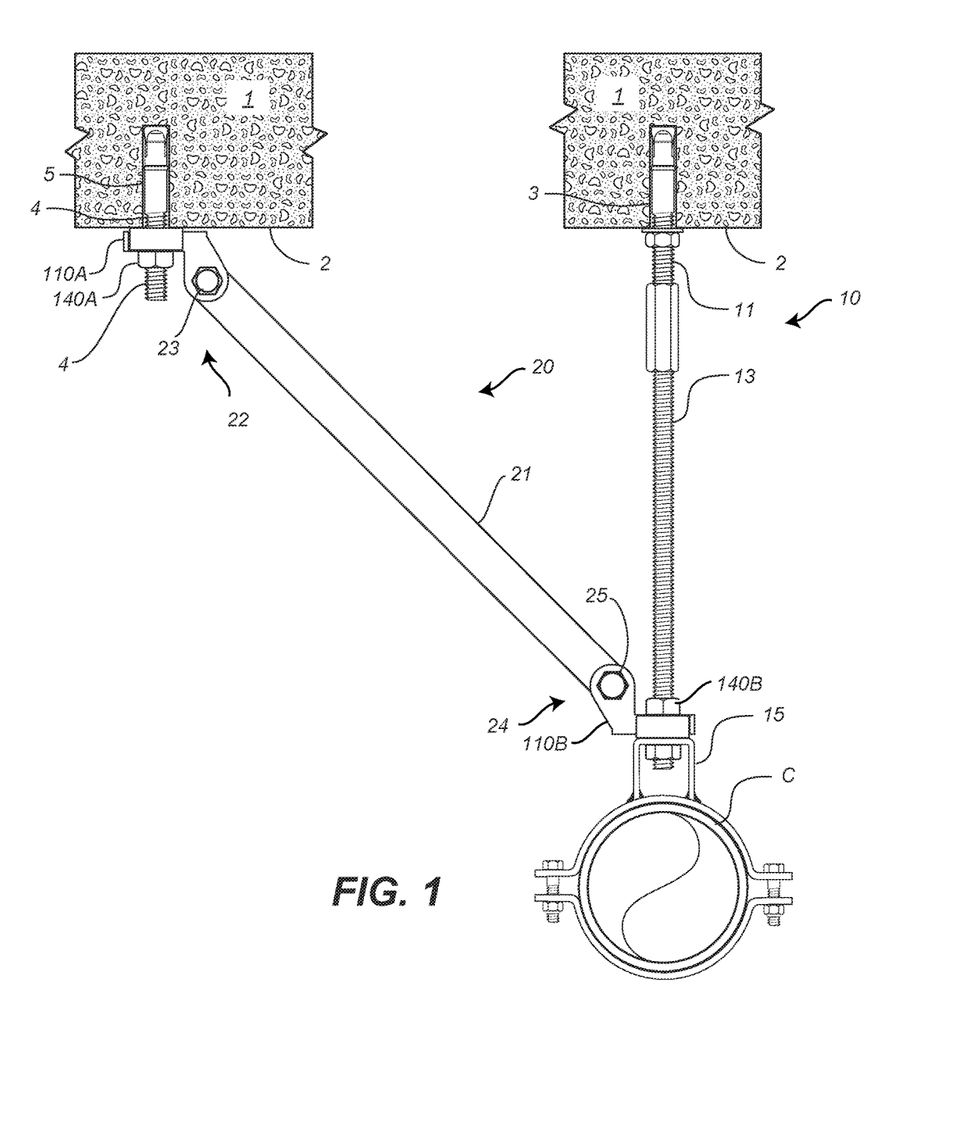
FIG. 1 is a side view of one embodiment of a bracket bracing a conduit.

Embodiments are presented herein of brackets which may be used to brace or stabilize loads suspended from overhead structures. By way of example, FIG. 1 is a side view of a brace 20 that utilizes inventive brackets 110A and 1110B in conjunction with a conduit hanger assembly 10. Conduit hanger assembly 10, which may be a prior art assembly, includes an anchor 3 which may be placed in overhead structure 1, a first threaded rod 11 extending downwards from the anchor, and a second threaded rod 13 attached to a bracket 15 that supports conduit C. There may be, in general, a plurality of conduit hanger assemblies that support a length of conduit C.

When overhead structure 1 is a concrete slab or formed metal decking filled with concrete, the anchor 3 may be a concrete-type anchorage that may be a drill-in, shoot-in or glue-in anchorage that is installed after the concrete has set, or a cast-in-place type anchorage that is positioned prior to the concrete being poured, so that it becomes cast into the finished concrete. An anchor will usually present a male threaded projection or female threaded aperture, allowing for a threaded connection between the conduit and the structure.

Typically, a length of conduit C is suspended from surface 2 by a distance of from 1 ft. to 6 ft. by hanger assemblies that are spaced from 6 ft. to 15 ft. apart along the length of the conduit. It is apparent that a plurality of conduit hanger assemblies so arranged is subject to side-to-side motion without further, lateral, restraint and thus lateral movement of conduit C is thus restrained by brace 20.

FIG. 1 further shows brace 20 as including brackets 110 and fasteners 140, and more specifically a first bracket 110A and a first fastener 140A, a second bracket 110B and a second fastener 140B, and a strut 21 with a first end 22 attached to first bracket 110A with bolt and nut set 23 and a second end 24 attached to second bracket 110B with bolt and nut set 25. First bracket 110A is attached to a threaded rod 4 in an anchor 5 in overhead structure 1, and second bracket 110B is attached to conduit hanger assembly 10. Second bracket 110A is attached to threaded rod 13 of conduit hanger assembly 10.

In general, brace 20 includes at least one bracket 110. Thus, in alternative embodiments, either first end 22 is attached to overhead structure 1 or second end 24 is attached to conduit hanger assembly 10 with attachments of some other design.

Figure 2A:
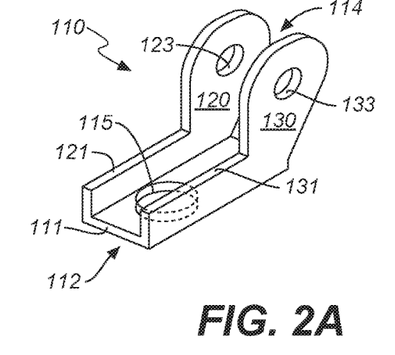
FIG. 2A is a first perspective view of the bracket.
Figure 2B:
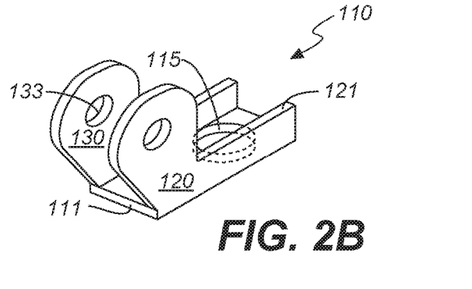
FIG. 2B is a second perspective view of the bracket of FIG. 2A.
Figure 3A:
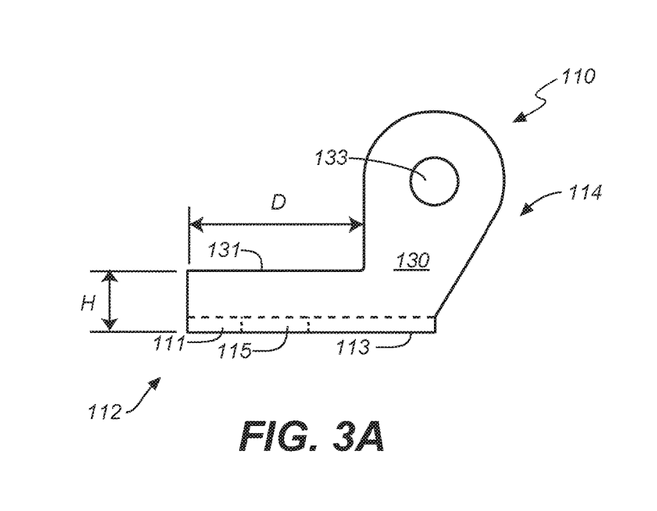
FIG. 3A is a side elevational view of the bracket of FIG. 2A.

First bracket 110A and second bracket 110B are generally the same and shown as bracket 110 in FIG. 2A as a first perspective view, in FIG. 2B as a second perspective view; FIG. 3A in a side elevational view, in FIG. 3B in an end elevational view, in FIG. 3C in a side elevational view.

Bracket 110 includes a base 111 having an outer surface 113 and an aperture 115, and two opposing sides 120 and 130 that protrude away from the base between a first bracket portion 112 and a second bracket portion 114. FIG. 3C shows a top view of a plane 116 that is perpendicular to surface 113 and midway between sides 120 and 130. Sides 120 and 130 are generally similar and include, at first bracket portion 112, a surface 121 and 131, respectively, that is generally parallel to surface 113. Sides 120 and 130 also include apertures 123 and 133, respectively, at second bracket portion 114.

Figure 3B:
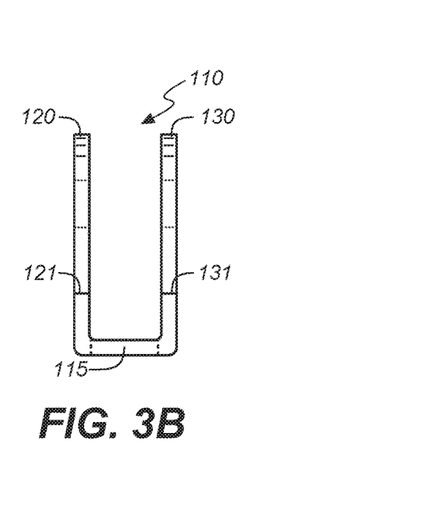
FIG. 3B is an end elevational view of the bracket of FIG. 2A.
Figure 3C:
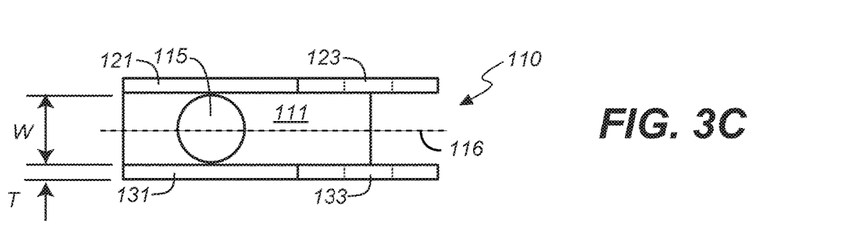
FIG. 3C is a side elevational view of the bracket of FIG. 2A.

Sides 120 and 130 are, in certain embodiments, at a right angle to surface 113, and are thus generally parallel to each other, as shown in FIGS. 3B and 3C.

In various embodiments, the dimensions of bracket 110 are H=⅜ inch to ⅝ inches, D=¾ inch to 1.5 inches, W=⅛ inches, and T=⅛ inch to 3/16 inches. Apertures 115, 123 and 133 have diameters of from ⅜ inch to ⅝ inch. Bracket 110 may be formed from metal, such as carbon steel or stainless steel.

Figure 4A:
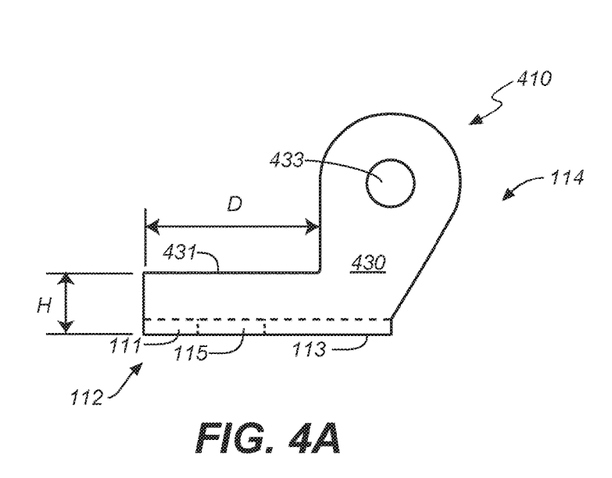
FIG. 4A is a side elevational view of an alternative embodiment bracket.
Figure 4B:
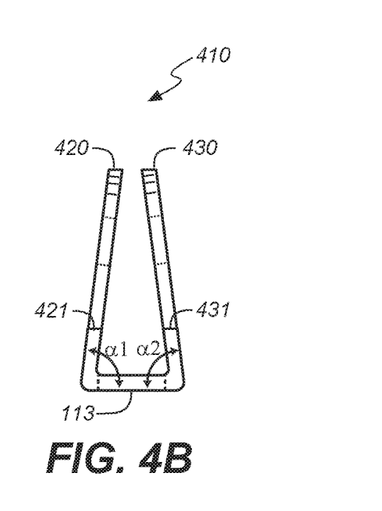
FIG. 4B is an end elevational view of the bracket of FIG. 4A.
Figure 4C:
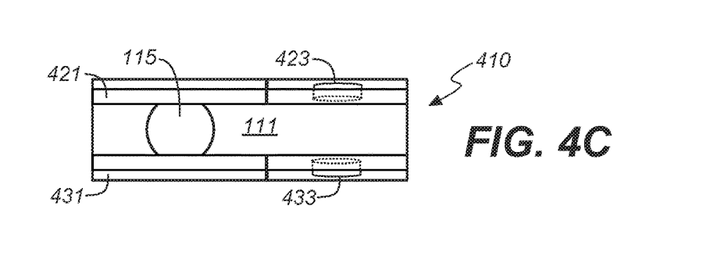
FIG. 4C is a side elevational view of the bracket of FIG. 4A.

An alternative embodiment bracket 410 is shown in FIG. 4A in a side elevational view, in FIG. 4B in an end elevational view, and in FIG. 4C in a side elevational view. Bracket 410 is generally similar to bracket 110, and includes base 111 with surface 113 and aperture 115, and two opposing sides 420 and 430 that, while similar to sides 120 and 130, are at an angle α1 and an angle α2, respectively, to surface 113 that is less than 90°. The angles α1 and α2 may be the same, or they may be different from one another. In general, sides 420 and 430 are generally similar and include a surface 421 and 431, respectively that is generally parallel to surface 113 and include apertures 423 and 433, respectively, at second bracket portion 114. The angles α1 and/or α2 may, in certain embodiments, be equal to 85°, 80°, 75°, 70°, 65°, or 60°. In other embodiments, the angles α1 and/or α2 may vary between first bracket portion 112 and second bracket portion 114, and may include portions with an angles α1 and/or α2 that is 90° or that is greater than 90°.

Figure 5A:
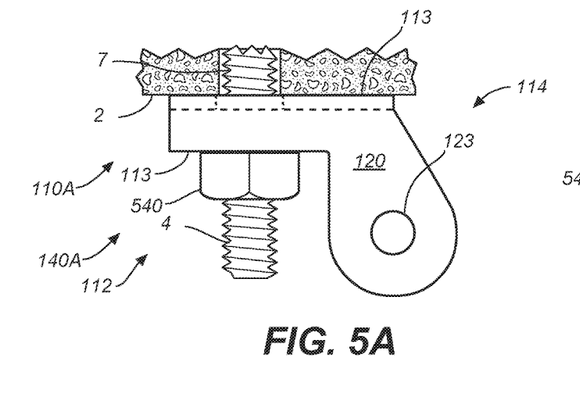
FIG. 5A is a side view of the bracket of FIG. 2A fastened with a nut.
Figure 5B:
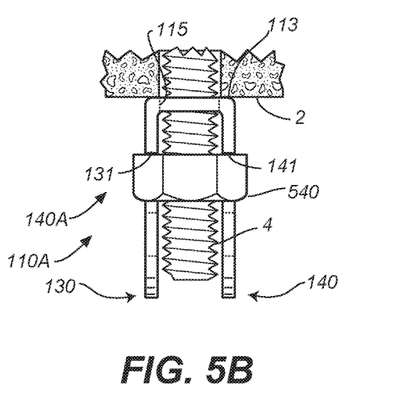
FIG. 5B is an end view of the embodiment of FIG. 4A.
Figure 5C:
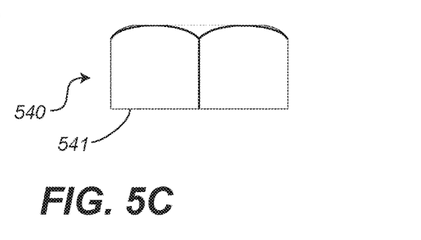
FIG. 5C is a side view of a nut.

Details of the fastening bracket 110A using first fastener 140A is shown in the side view of FIG. 5A and the end view of FIG. 5B and the details the first fastener, which is a nut 540, is shown in the side view of FIG. 5C and the bottom view of FIG. 5B.

Figure 5D:
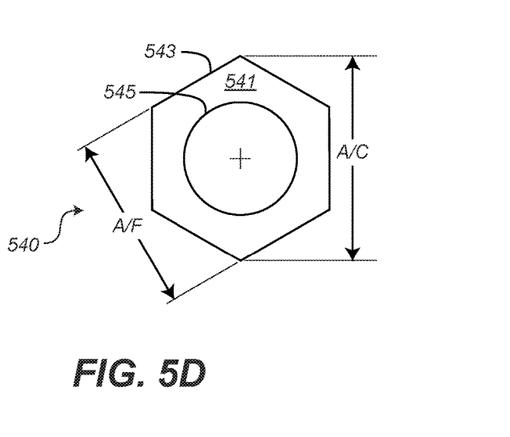
FIG. 5D is a bottom view of the nut of FIG. 5A.

As shown in FIGS. 5A and 5B, surface 113 is placed against surface 2 and nut 540 is threaded onto rod 4. As shown in FIGS. 5C and 5D, nut 520 has threaded hole 545 for threading onto threaded rod 4, and a face 541 surrounding the hole and bound by a hexagonal edge 543. The dimensions of face 541 include the flat-to-flat spacing A/F and the corner-to-corner spacing A/C. Face 541 of first fastener 140A seats against both surfaces 131 and 141. The dimensions of face 541 are thus at least as wide as dimension W of fastener 110, and thus the dimension A/F or the dimension A/C is greater than the dimension W.

Sides 120 and 130 are located very near aperture 115, and are thus near anchor rod 4 so that, when a fastener 140A is threaded onto the rod, the fastener contacts surfaces 131 and 141 of bracket 110A, and compresses first bracket portion 112, thus clamping surface 113 of the bracket to structure 1. Thus, when fastener 140A is tightened onto bracket 110A, sides 120 and 130 of first bracket portion 112 are in compression and, with bottom 111 and the fastener, form a box-like structure. This structure is less prone to bending than if fastener 140A had been tightened onto bottom 111 directly.

Similarly, fastener 140B may be tightened against bracket 110B with surface 113 against bracket 15.

Figure 6A:
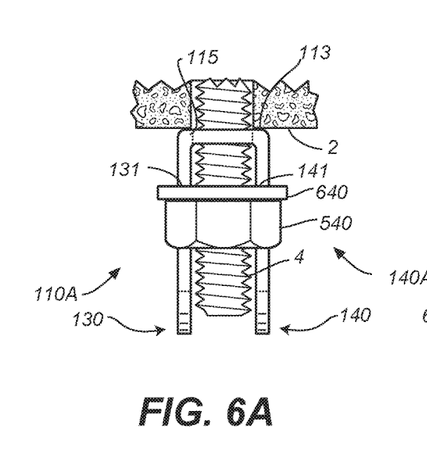
FIG. 6A is an end elevational view of the bracket of FIG. 4A secured with a washer.
Figure 6B:
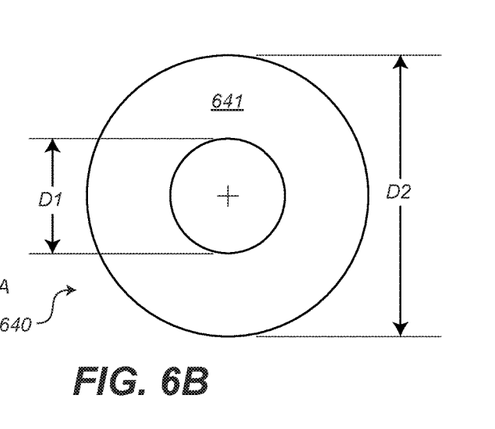
FIG. 6B is a bottom view of a washer for use with the inventive bracket.

Details of the fastening of bracket 110A using an alternative first fastener 140A is shown in the end view of FIG. 6A and bottom view of FIG. 6B of the alternative first fastener, which includes nut 540 and washer 640, is shown in the side view of FIG. 5C and the bottom view of the washer in FIG. 5B.

As shown in FIG. 6A, surface 113 is placed against surface 2, washer 640 is placed onto rod 4, and nut 540 is threaded onto the rod. As shown in FIG. 6B, washer 640 has a face 641 that extends from diameter D1 to diameter D2. FIG. 6A shows face 641 of first fastener 140A seating against both surfaces 131 and 141. The dimensions of face 641 are thus at least as wide as dimension W of fastener 110, and thus the D2 is greater than the dimension W.

When first fastener 140A is tightened onto bracket 110A, sides 120 and 130 of first bracket portion 112 are in compression and, with bottom 111, washer 640 and nut 540, form a box-like structure. This structure is less prone to bending than if the nut had been tightened onto bottom 111 directly. Second fastener 140B may also include the combination of nut 540 and washer 640 for securing second bracket 110B.

Figure 7:
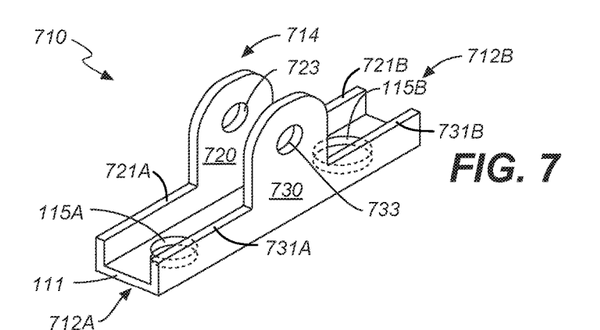
FIG. 7 is a perspective view of another alternate embodiment of the inventive seismic bracket.
Figures 8A, 8B, 8C:
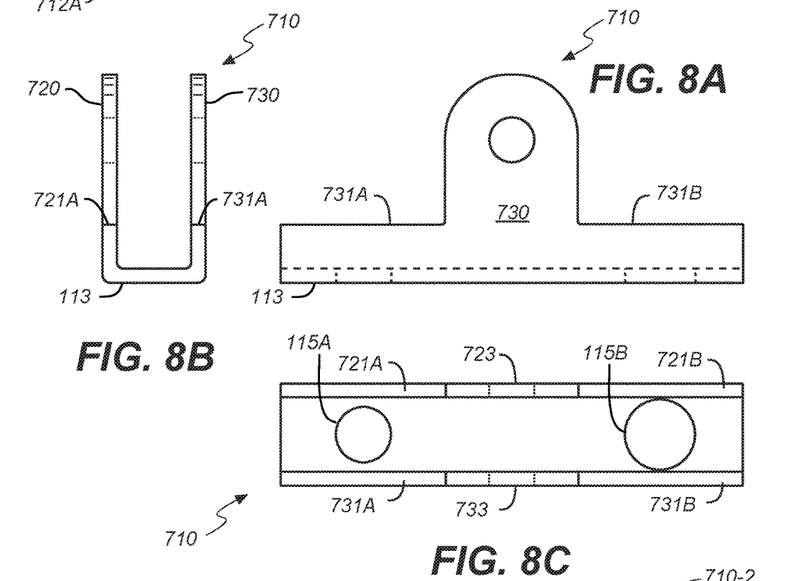
FIG. 8A is a side elevational view of the alternate embodiment of the inventive seismic bracket shown in FIG. 7.
FIG. 8B is an end elevational view of the alternate embodiment of the inventive seismic bracket shown in FIG. 8A.
FIG. 8C is a top plan view of the alternate embodiment of the inventive seismic bracket shown in FIG. 8A.

An alternative bracket 710 is illustrated in the perspective view of FIG. 7, the side elevational view of FIG. 8A, the end elevational view of FIG. 8B, and the top plan view of FIG. 8C. Bracket 710 is generally similar to brackets 110 and 410, except as explicitly noted.

Bracket 710 includes base 111 with a surface 113 and a pair of apertures 115A and 115B, which are generally similar to aperture 115, and two opposing sides 720 and 730 that protrude away from the base at a first bracket portion 712A and a second bracket portion 712B, which are both similar to bracket portion 112, and a third bracket portion 714 which is similar to bracket portion 114. Sides 720 and 730 are generally similar and include, at first bracket portion 712A, a surface 721A and 731A, respectively, that is generally parallel to surface 113, and at second bracket portion 712B, a surface 721B and 731B, respectively, that is generally parallel to surface 113. Sides 120 and 130 also include apertures 723 and 733, respectively, at third bracket portion 714.

Bracket 710 may be attached to a surface, such as surface 2 or bracket 15, by placing either or both of apertures 715A or 715B through a threaded rod and fastening the bracket to the threaded rod, as illustrated above with reference to FIG. 5 or 6.

In certain embodiments, two or more brackets, which may include one of brackets 110, 410, or 710, may be stacked with the same threaded rod protruding through a corresponding aperture 115, 715A or 715B. Thus, for example, surface 113 of a first bracket 110, 410, or 710 may be placed against a surface, such as surface 2 or bracket 15, and surface 113 of a second bracket 110, 410, or 710 may be placed against surfaces 131/141, 431/441, 721A/721A, or 731A/741A of the first bracket. The first and second brackets are placed with corresponding aperture 115, 715A or 715B over the same rod, such as rod 4 or 13, and one fastener 140 is threaded onto the second bracket to mount the brackets to the a surface. The stacking of brackets allows for running multiple braces from the same anchor point.

Figure 9A:
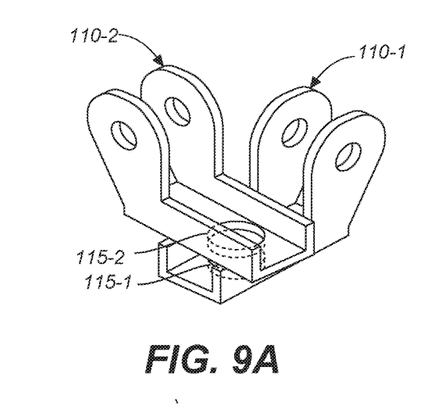
FIG. 9A is a perspective view of two brackets of FIG. 2A stacked.
Figure 9B:
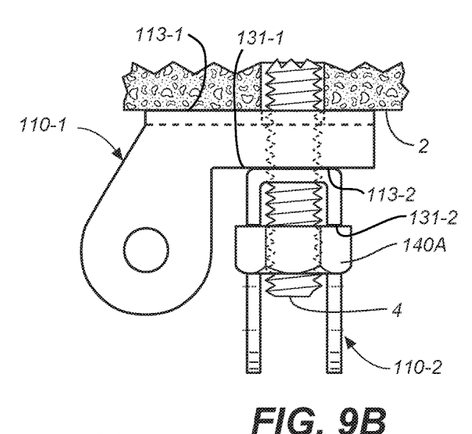
FIG. 9B is an elevational view of the brackets of FIG. 9A after installation.

Thus, for example, FIG. 9A is a perspective view of two brackets 110-1 and 110-2 stacked, and FIG. 9B is an elevational view of the brackets of FIG. 9A after installation. Brackets 110-1 and 110-2 are both the same as bracket 110, with the suffix "-1" and "-2" indicating parts of bracket corresponding to the elements of bracket 110.

Brackets 110-1 and 110-2 are arranged at right angles, with surface 113-1 of bracket 110-1 on surface 2 and, surface 113-2 of bracket 110-2 on surfaces 121-1 and 131-1 of bracket 110-1, and with threaded rod 4 passing though both of apertures 115-1 and 115-2 and fastened with fastener 140. This configuration allows for two braces—one attached to apertures 123-1/133-1 of bracket 110-1 and a second brace attached to apertures 123-2/133-2 of bracket 110-2.

Figure 9C:
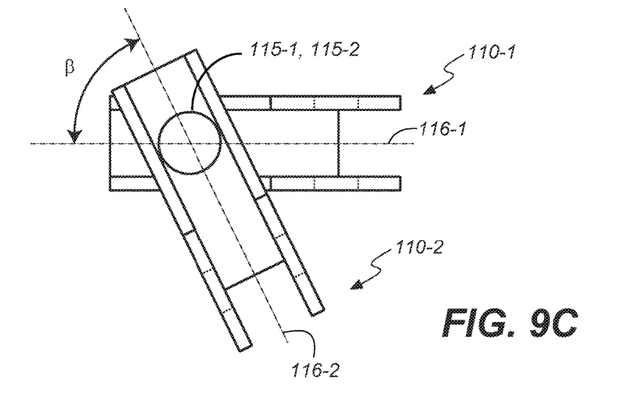
FIG. 9C is a top view of FIG. 9A illustrating the rotational orientation of the two brackets.

FIG. 9C is a top view of FIG. 9A illustrating the rotational orientation of Brackets 110-1 and 110-2. FIG. 9C shows that the planes 116-1 and 116-2 between brackets 110-1 and 110-2 intersect at an angle β about the center of apertures 115-1 and 115-2. The angle β is limited by the size of surfaces 113, 121, and 131, and can, in general be within a range of 180°, such as from β=15° to β=345°.

Figure 10A:
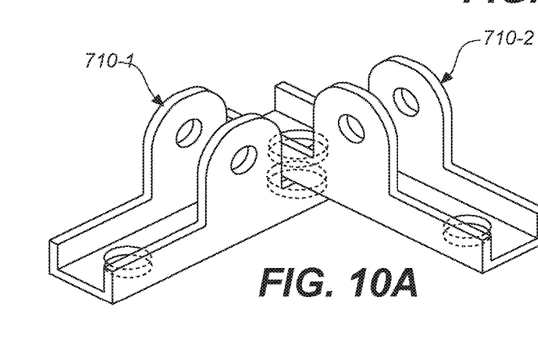
FIG. 10A is a perspective view of two brackets of FIG. 7 stacked.
Figure 10B:
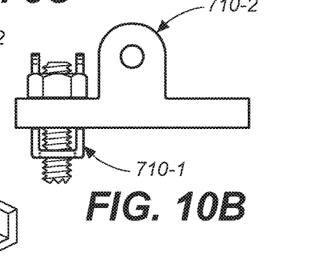
FIG. 10B is an elevational view of the brackets of FIG. 10A after installation

The rotational orientation of stacked brackets can be applied to any combination of brackets described herein. Thus, for example, FIG. 10A is a perspective view of two stacked brackets 710-1 and 710-2, and FIG. 9B is an elevational view of the brackets of FIG. 9A after installation. Brackets 710-1 and 710-2 are both the same as bracket 710, with the suffix "-1" and "-2" indicating parts of bracket corresponding to the elements of bracket 710.

In certain circumstances, brace 20 is assembled during installation of conduits. In other circumstances, brace 20, or the other braces described herein, is attached to previously installed conduit hanger assemblies 10. When this is the case, it may be difficult, for example, to place aperture 115 of bracket 110B over rod 13, as this may require dissembling conduit hanger assembly 10.

Figure 11A:
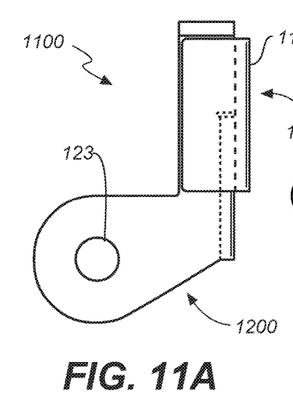
FIG. 11A is a side elevational view of an alternative embodiment bracket.
Figure 11B:
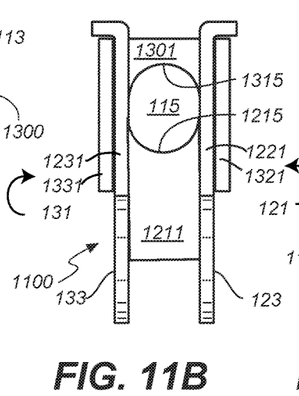
FIG. 11B is a top plan view of the bracket of FIG. 11A.
Figure 11C:
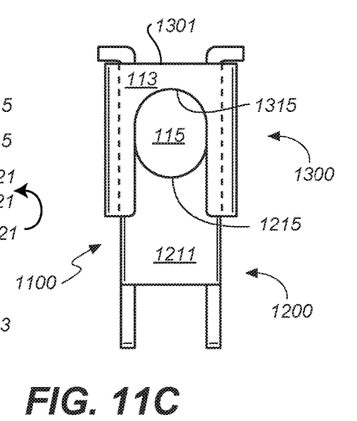
FIG. 11C is a bottom plan view of the bracket of FIG. 11A.
Figures 12A, 12B:
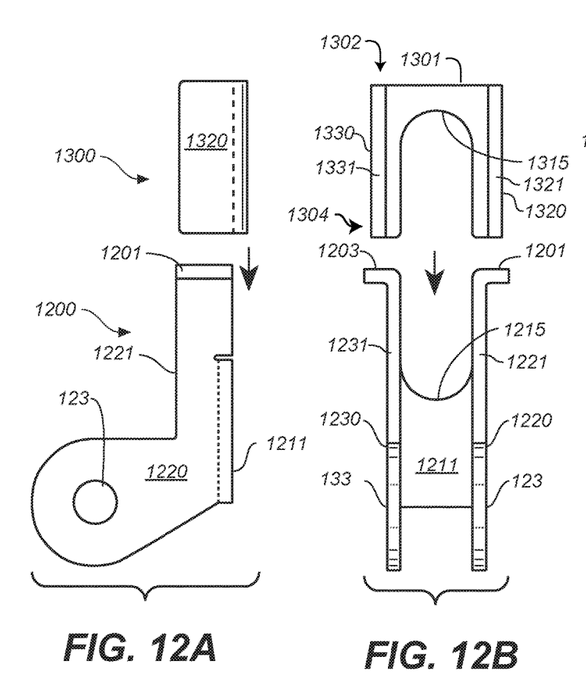
FIG. 12A is an exploded side elevational view of the view of FIG. 11A.
FIG. 12B is an exploded top plan view of the view of FIG. 11B.
Figure 12C:
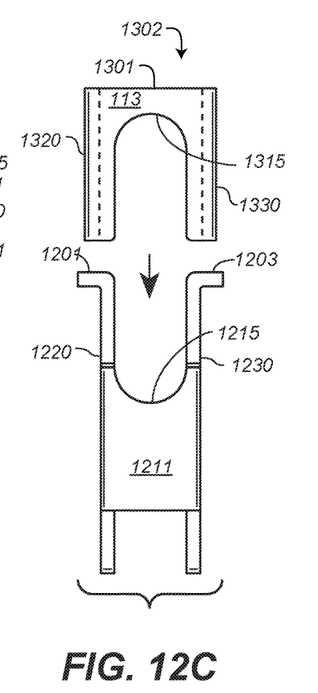
FIG. 12C is an exploded bottom plan view of the view of FIG. 11C.
Figure 13A:
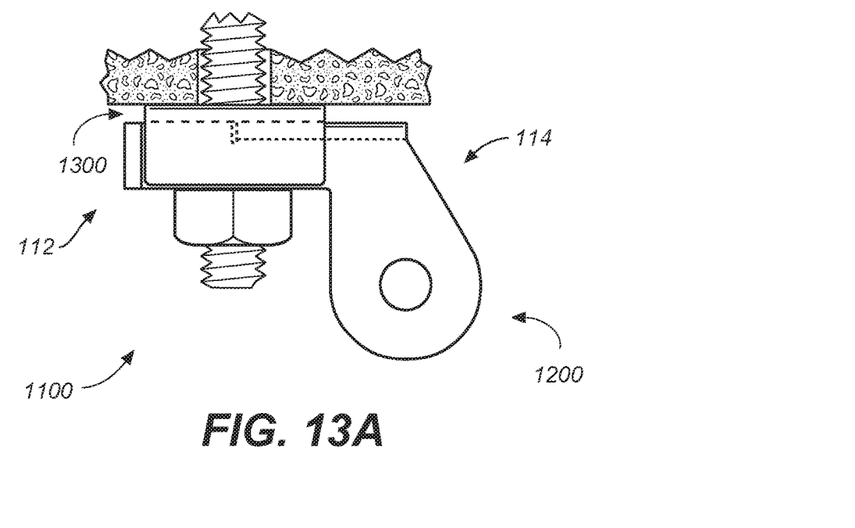
FIG. 13A is side view of the bracket of FIG. 11A as installed.
Figure 13B:
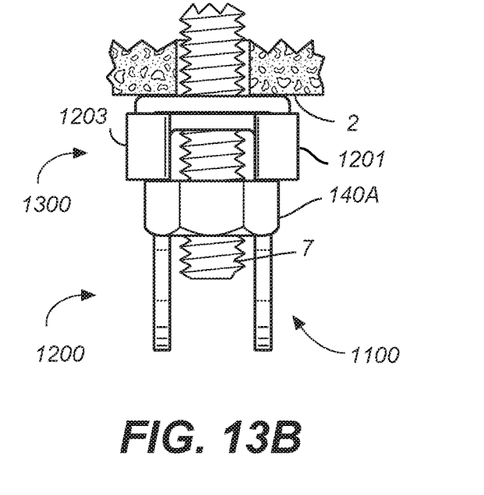
FIG. 13B is an end elevational view of the bracket of FIG. 13A.
Figure 13C:
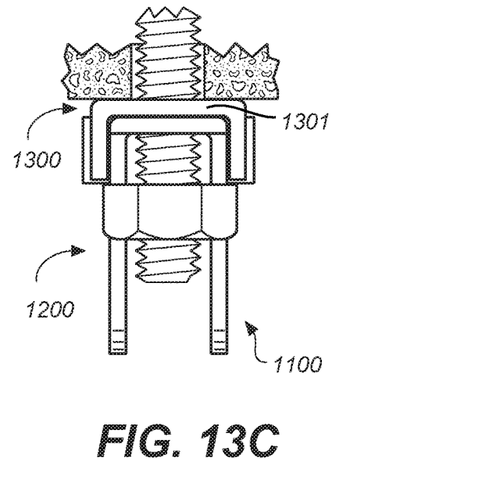
FIG. 13C is the opposite end elevational view of the bracket of FIG. 13A.

An alternative embodiment of a bracket 1100 allows the bracket to be placed around an installed rod without the need of removing the rod or removing elements previously attached to the rod. Bracket 1100 is illustrated in FIG. 11A as a side elevational view of the bracket, FIG. 11B is a top plan view of the bracket, FIG. 11C is a bottom plan view of the bracket; FIG. 12A is an exploded side elevational view of the view of FIG. 11A, FIG. 12B is an exploded top plan view of the view of FIG. 11B, and FIG. 12C is an exploded bottom plan view of the view of FIG. 11C. FIG. 13A is side view of the bracket of FIG. 11A as installed, FIG. 13B is an end elevational view of the bracket of FIG. 13A. Bracket 1100 is generally similar to brackets 110, 410, and 710, except as explicitly noted.

Bracket 1100 includes two parts: a first bracket part 1200 and a second bracket part 1300. When bracket parts 1200 and 1300 are assembled, as shown in FIGS. 11A, 11B, and 11C, the bracket includes apertures 115, 123, and 133 and surfaces 113, 121, and 131. Bracket 1110 may thus be used as any one of brackets 110 or 410.

Bracket parts 1200 and 1300 are separable, allowing bracket 1100 to be placed onto a threaded rod more easily that brackets 110 or 410. Specifically, as shown in FIGS. 12A, 12B, and 12C, bracket part 1200 includes a bottom 1211 and sides 1220 and 1230 which protrude away from the bottom. Bottom 1211 includes an edge 1215 forming the end of a slot between sides 1220 and 1230. Side 1220 includes aperture 123, a surface 1221, and a flange 1201, and side 1230 includes aperture 133, a surface 1231, and a flange 1203. Bracket part 1300 includes bottom 1311 and sides 1320 and 1330 which protrude away from the bottom and which extend from end 1302 to end 1304. Bottom 1311 includes an edge 1315, forming a slot between sides 1320 and 1320, and a surface 113. Side 1320 includes a surface 1321, and side 1330 includes a surface 1331.

Brackets parts 1200 and 1300 are assembled to form bracket 1100 by placing end 1302 of bracket part 1300 against flanges 1201 and 1203 with bottom 1311 against bottom 1211. Bracket parts 1200 and 1300 can either be assembled and placed over the end of a threaded rod, or can be placed on either side of the threaded rod. Thus, for example, sides 1220 and 1230 of bracket part 1200 can be moved over a rod so that edge 1215 is against the rod, and sides 1320 and 1330 of bracket part 1300 can be moved so that 1315 is against the same rod, with flanges 1201 and 1203 mated against second bracket part 1300 as shown in FIGS. 11A, 11B, and 11C.

When so assembled, surfaces 1221 and 1321 are adjacent and form surface 121 and surfaces 1231 and 1331 form surface 131, as shown in FIG. 11B, and surfaces 1215 and 1315 form aperture 115, as shown in FIGS. 11B and 11C.

Figures 14A, 14B:
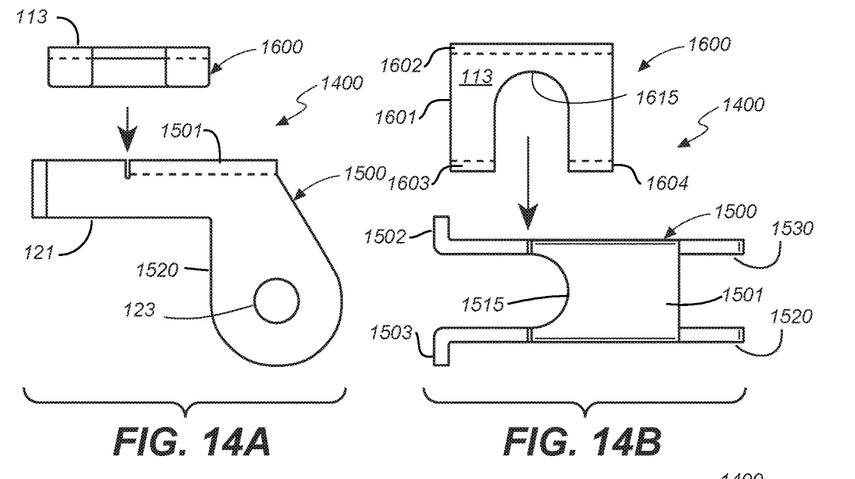
FIG. 14A is an exploded side elevational view of another embodiment of a bracket.
FIG. 14B is an exploded bottom plan view of the bracket shown in FIG. 14A.
Figure 15A:
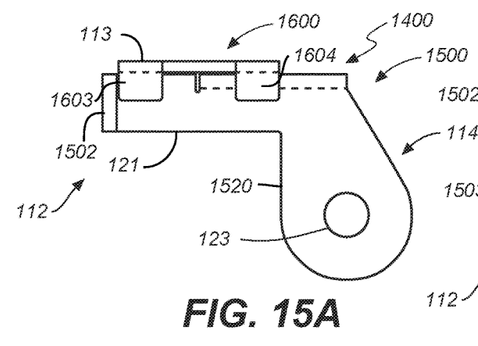
FIG. 15A is a side elevational view of the bracket shown in FIG. 14A.
Figure 15B:
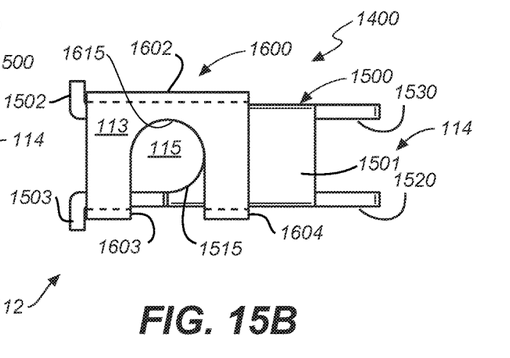
FIG. 15B is a bottom plan view of the bracket shown in FIG. 15A.

An alternative bracket 1400 is illustrated in FIG. 14A as an exploded side elevational view, FIG. 14B as an exploded bottom plan view, FIG. 15A as a side elevational view, and FIG. 15B as a bottom plan view of the bracket shown in FIG. 15A. Bracket 1400 is similar to bracket 1100, except as explicitly stated, and allows for the bracket to be placed around a rod.

Bracket 1400 includes two parts: a first bracket part 1500 and a second bracket part 1600. When bracket parts 1600 and 1600 are assembled, as shown in FIGS. 15A and 15B, the bracket includes apertures 115, 123, and 133 and surfaces 113, 121, and 131. Bracket 1110 may thus be used as any one of brackets 110, 410, or 1100.

Bracket parts 1500 and 1500 are separable, allowing bracket 1400 to be placed onto a threaded rod more easily that brackets 110 or 410. Specifically, bracket part 1500 includes a bottom 1501 and sides 1520 and 1530 which protrude away from the bottom. Bottom 1501 includes an edge 1515 forming the end of a slot between sides 1520 and 1530. Side 1520 includes aperture 123, a surface 121, and a flange 1503, and side 1230 includes aperture 133 (not shown), a surface 131 (not shown), and a flange 1502. Bracket part 1600 includes bottom 1601 and sides 1602, 1603, and 1604 which protrude away from the bottom.

Bottom 1601 includes an edge 1615, forming a slot between sides 1603 and 1604, and a surface 113.

As shown in the Figures, brackets parts 1500 and 1600 are assembled to form bracket 1400 by placing side 1602 against side 1530, sides 1603 and 1604 against side 1520, and sides 1502 and 1503 against sides 1602 and 1603, respectively. Bracket parts 1500 and 1600 can either be assembled and placed over the end of a threaded rod, or can be placed on either side of the threaded rod. When so assembled, surfaces 1515 and 1515 form aperture 115, as shown in FIG. 15B.

Figure 16:
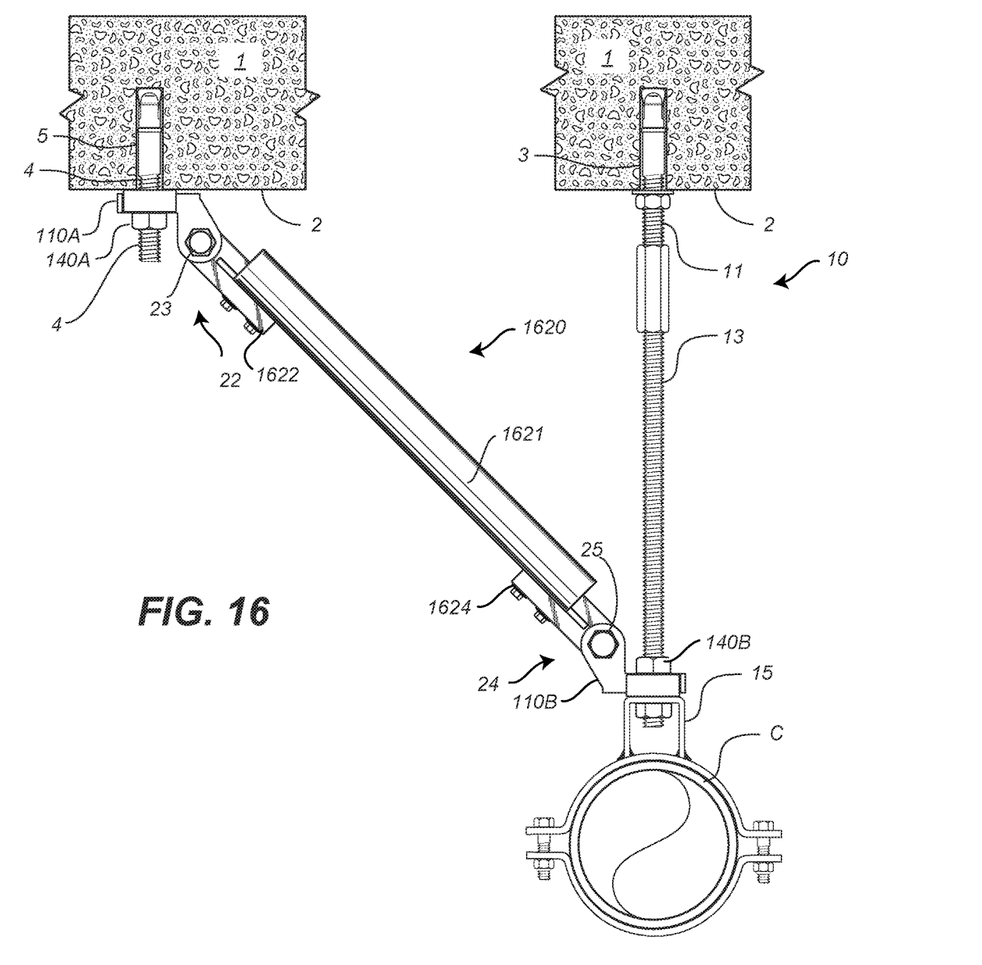
FIG. 16 is a side elevational view of a first alternative brace.

FIG. 16 is a side elevational view of a first alternative brace 1620 in place of brace 10 of FIG. 1. Brace 1620 includes first bracket 110A and first fastener 140A, a first link 1622 attached to the first bracket with bolt and nut set 23, a connector piece 1621 bolted to the first link at one connector piece end and bolted to a second link 1624 at the other connector piece end, a second bracket 110B bolted to the second link with bolt and nut set 24, and second fastener 140B.

In one embodiment, first link 1622, second link 1624, and connector piece 1621 are described as links 44 and connector piece 42 in co-pending and co-owned U.S. patent application Ser. No. 15/052,067, the contents of which are hereby incorporated by reference. As described in U.S. patent application Ser. No. 15/052,067, connector piece 1621 is fragile and is designed to fail before the concrete is damaged in the event of a seismic event.

Figure 17:
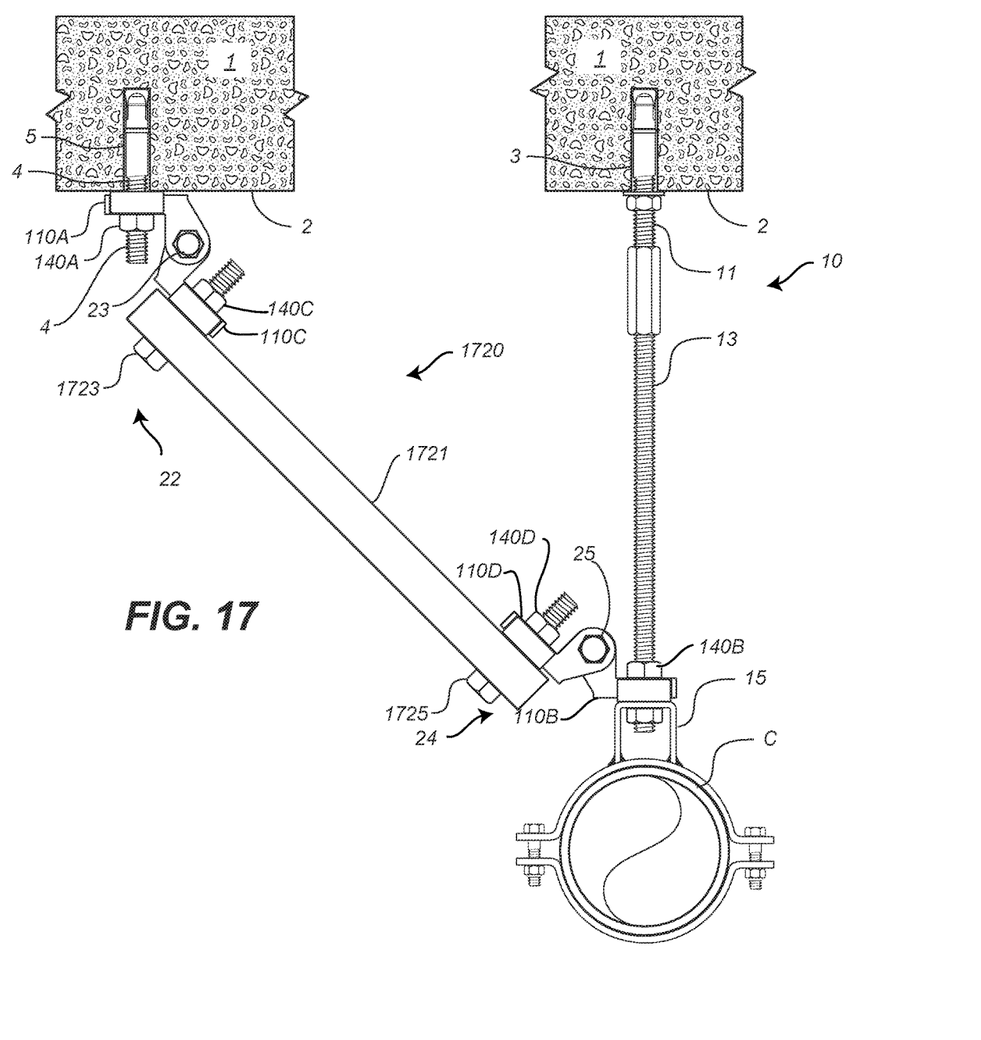
FIG. 17 is a side elevational view of a second alternative brace.

FIG. 17 is a side elevational view of an alternative brace 1720 in place of brace 10 of FIG. 1. Brace 1720 connects various brackets 110 at apertures 123/133 to provide greater flexibility in configuring the brace.

Brace 1720 includes first bracket 110A and first fastener 140A, a third bracket 110C, bolt and nut set 23 that attaches the first and third brackets, a strut 1721 attached at one end to the third bracket with a first bolt 1723 and a third fastener 140C, a second bolt 1725 attached to a second end of the strut with a fourth fastener 140D, bolt and nut set 25 which attaches the fourth bracket to second bracket 110B, and second fastener 140B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. An apparatus for mounting to a threaded rod protruding from a mounting surface, said apparatus comprising:
   a bracket including:
      a first portion including a first surface having a first aperture;
      a second portion extending away from said first portion and including a second aperture and a first fastener surface; and
      a third portion extending away from said first portion and including a third aperture and a second fastener surface,
   where said first aperture is sized to accept the threaded rod when said first surface is placed against the mounting surface,
   where said first fastener surface and said second fastener surface are both parallel to said first portion and are spaced by a gap distance on either side of said first aperture; and
   where said second aperture and said third aperture are aligned to accept a first fastener that is generally perpendicular to said threaded rod when said first surface is placed against the mounting surface.

2. The apparatus of claim 1 further including:
   a second fastener including a second nut threadable on the threaded rod, where said second fastener has a second fastener face larger than said gap distance,
   such that when said first surface is placed against the mounting surface with the threaded rod protruding through said first aperture, and said second fastener is tightened onto the threaded rod with said second fastener face contacting said first fastener surface and said second fastener surface, said second portion and said third portion are in compression.

3. The apparatus of claim 2, where said second fastener face is the face of said second nut.

4. The apparatus of claim 3, where said second nut is a hexagonal nut, and where the diameter A/F across the flats of said second nut is greater than said gap distance.

5. The apparatus of claim 3, where said second nut is a hexagonal nut, and where the diameter A/C across the corners of said second nut is greater than said gap distance.

6. The apparatus of claim 2, where said second fastener includes a washer, and where said second fastener face is the face of said washer.

7. The apparatus of claim 1, where the angle between said first surface and at least a portion of said second portion is 90°.

8. The apparatus of claim 1, where the angle between said first surface and at least a portion of said third portion is 90°.

9. The apparatus of claim 1, where the angle between said first surface and at least a portion of said second portion is less than 90°.

10. The apparatus of claim 1, where the angle between said first surface and at least a portion of said third portion is less than 90°.

11. The apparatus of claim 1,
   where said bracket includes a first bracket part and a second bracket part, where said first bracket part includes a pair of first walls connected by a first bottom having a first edge and separated by a distance greater than the diameter of the threaded rod, where said second bracket part includes a pair of second walls connected by a second bottom having a second edge separated by a distance greater than the diameter of the threaded rod, such that the first bracket part is placeable with said first edge against the threaded rod and such that the second bracket part is placeable with said second edge against the threaded rod to form said first aperture between said first edge and said second edge.

12. An apparatus for mounting to a threaded rod protruding from a mounting surface, said apparatus comprising:
a first bracket configured for mounting on the surface, said first bracket including:
a first portion including a first surface having a first aperture;
a second portion extending away from said first portion and including a second aperture and a first fastener surface; and
a third portion extending away from said first portion and including a third aperture and a second fastener surface,
where said second aperture and said third aperture are aligned to accept a first fastener that is generally perpendicular to said threaded rod when said first surface is placed against the mounting surface,
where said first fastener surface and said second fastener surface are both parallel to said first portion, are spaced by a gap distance on either side of said first aperture, and define a plane perpendicular to and between said first fastener surface and said second fastener surface; and
where said first aperture is sized to accept the threaded rod when said first surface is placed against the mounting surface,
a second bracket configured for mounting on said first bracket, said second bracket including:
a first portion including a first surface having a first aperture;
a second portion extending away from said first portion and including a second aperture and a first fastener surface; and
a third portion extending away from said first portion and including a third aperture and a second fastener surface,
where said second aperture and said third aperture are aligned to accept a fastener that is generally perpendicular to said threaded rod when said first surface is placed against the mounting surface,
where said first fastener surface and said second fastener surface are both parallel to said first portion, are spaced by a gap distance on either side of said first aperture, and define a plane perpendicular to and between said first fastener surface and said second fastener surface; and
where said first aperture is sized to accept the threaded rod when said first surface is placed against the first and second fastener surfaces of said first bracket.

13. An apparatus of claim 12, where an angle between the plane of said first bracket and the plane of said second bracket is between 15° and 345°.

14. The apparatus of claim 12, further including:
a second fastener including a second nut threadable on the threaded rod, where said second fastener has a second fastener face larger than said gap distance,
such that when said first surface of said first bracket is placed against the mounting surface and when said first surface of said second bracket is placed against said first fastener surface and said second fastener surface of said first bracket, said second fastener contacts said first fastener surface and said second fastener surface of said second bracket.

15. The apparatus of claim 14, where said second fastener face is the face of said nut.

16. The apparatus of claim 15, where said second nut is a hexagonal nut, and where the diameter A/F across the flats of said second nut is greater than said gap distance of said second bracket.

17. The apparatus of claim 15, where said second nut is a hexagonal nut, and where the diameter A/C across the corners of said second nut is greater than said gap distance of said second bracket.

18. The apparatus of claim 14, where said second fastener includes a washer, and where said second fastener face is the face of said washer.

19. The apparatus of claim 12, where the angle between said first surface and at least a portion of said second portion of either said first bracket or said second bracket is 90°.

20. The apparatus of claim 12, where the angle between said first surface and at least a portion of said third portion of either said first bracket or said second bracket is 90°.

21. The apparatus of claim 12, where the angle between said first surface and at least a portion of said second portion of either said first bracket or said second bracket is less than 90°.

22. The apparatus of claim 12, where the angle between said first surface and at least a portion of said third portion of either said first bracket or said second bracket is less than 90°.

23. The apparatus of claim 1,
where said first portion includes a fourth aperture, where said second portion includes a third fastener surface, where said third portion includes a fourth fastener surface, where said threaded rod is a first threaded rod, and where said gap distance is a first gap distance,
where said fourth aperture is sized to accept a second threaded rod protruding from the mounting surface when said first surface is placed against the mounting surface, and
where said third fastener surface and said fourth fastener surface are both parallel to said first portion and are spaced by a second gap distance on either side of said fourth aperture.

24. The apparatus of claim 23 further including:
a second fastener including a second nut threadable on the first threaded rod, where said second fastener has a second fastener face larger than said first gap distance,
a third fastener including a third nut threadable on the second threaded rod, where said third fastener has a third fastener face larger than said second gap distance,
such that when said first surface is placed against the mounting surface with the first threaded rod protruding through said first aperture, and said second fastener is tightened onto the first threaded rod with said second fastener face contacting said first fastener surface and said second fastener surface, said bracket near said second portion and said third portion are in compression, and such that when the second threaded rod protrudes through said third aperture, and said third fastener is tightened onto the second threaded rod with said third fastener face contacting said third fastener surface and said fourth fastener surface, said bracket near said second portion and said third portion are in compression.

25. The apparatus of claim 24, where said second fastener face is the face of said second nut.

26. The apparatus of claim 25, where said second nut is a hexagonal nut, where the diameter A/F across the flats of the second nut is greater than said first gap distance.

27. The apparatus of claim 25, where said third nut is a hexagonal nut, and where the diameter A/F across the flats of the third nut is greater than said second gap distance.

28. The apparatus of claim 25, where said third nut is a hexagonal nut, where the diameter A/C across the flats of the third nut is greater than said first gap distance.

29. The apparatus of claim 25, where said third nut is a hexagonal nut, and where the diameter A/C across the flats of the third nut is greater than said second gap distance.

30. The apparatus of claim 24, where said first fastener includes a first washer, and where said first fastener face is the face of said first washer.

31. The apparatus of claim 24, where said second fastener includes a second washer, and where said second fastener face is the face of said second washer.

* * * * *